United States Patent
Valkanas

[11] Patent Number: 6,150,449
[45] Date of Patent: Nov. 21, 2000

[54] FIRE RESISTANT COMPOSITIONS

[75] Inventor: George N. Valkanas, Maroussi, Greece

[73] Assignee: Innoval Management Limited, Curacao, New Caledonia

[21] Appl. No.: 09/230,256

[22] PCT Filed: Jul. 15, 1997

[86] PCT No.: PCT/GR97/00029

§ 371 Date: Mar. 22, 1999

§ 102(e) Date: Mar. 22, 1999

[87] PCT Pub. No.: WO98/03593

PCT Pub. Date: Jan. 29, 1998

[30] Foreign Application Priority Data

Jul. 22, 1996 [GR] Greece ................................. 960100258

[51] Int. Cl.$^7$ ............................... C08K 3/26; C08K 3/34; B32B 27/08
[52] U.S. Cl. .......................... 524/425; 524/442; 524/570; 524/836; 428/500
[58] Field of Search ..................................... 524/570, 836, 524/425, 442; 428/500

[56] References Cited

FOREIGN PATENT DOCUMENTS

| 0410662 | 1/1991 | European Pat. Off. . |
| 0675177 | 10/1995 | European Pat. Off. . |
| 59-176351 | 10/1984 | Japan . |

*Primary Examiner*—Kriellion Sanders
*Attorney, Agent, or Firm*—Birch, Stewart, Kolasch & Birch, LLP

[57] ABSTRACT

A method is described for protection against fire with coating and paint compositions for houses, polymer constructions, industrial installations, and transport vehicles, in which polymeric products produced by processing polystyrene and copolymers to macroreticular structure are introduced with the incorporation of ionic groups at high density, thus acquiring the potential to very strongly absorb water up to 400 times weight endomolecularly. They can be used in paint and general coating compositions as a first surface coating or can be in aqueous paint emulsions as a main coating. Inorganic materials such as lime, gypsum, silicones etc. can also be added. The products in the coating compositions when burned or decomposed in a fire edge release much water and quenches the fire immediately offering complete protection against fire.

14 Claims, No Drawings

FIRE RESISTANT COMPOSITIONS

This application is the national phase under 35 U.S.C. §371 of prior PCT International Application No. PCT/GR97/00029 which has an International filing date of Jul. 15, 1997 which designated the United States of America.

FIELD OF THE INVENTION

The invention described relates to an innovation introducing an original fire resistant coating composition.

BACKGROUND OF THE INVENTION

Fires constitute a critical problem of life and of security for man today resulting in insecurity in houses, in community events and in the environment. Public opinion indicates that all these should be offered with fire protection and with fire resistant constructions.

The houses being constructed with inorganic materials and with cement, stones and bricks are not flammable. However, the additions, the artistic wood articles, the electrical cables, the telephone connections and all the surfaces being colored with organic dyes introduce into houses elements of construction which can burn, resulting to insecurity and discomfort. The rest, which make property outside the houses, transport, halls, places for civil actions, etc. all contain mostly flammable material and frequent polymer construction creating conditions that lead to fires which can burn vigorously and fast.

The scientific conception to face those life problems is to introduce fire safety regulations in the construction of houses and in the transport of goods for the protection against fire, which has resulted to an international scientific mobilization to provide such solutions.

We have dealt with this problem and have worked to create solutions providing protection against fire in the creation of fire resistant surface coatings. We have invented a surface coating composition for introducing in houses and in life goods protection from fire with a fire resistant coating.

DETAILED DESCRIPTION

The innovative compositions we have developed and tested are coatings formulated so that the first coating surface contains products which have absorbed water so that the coating composition acquires fire resistant properties. These added products are polymeric multiprocessed products which become macroreticular of high material stability, thereby permitting the introduction in them of ionic group at high density, after which they acquire the ability to absorb much water endomolecularly up to 400 times by weight, and to keep that water very strongly (we need to apply high pressure to take it out).

The polymeric products which are multiprocessed to become macroreticular at an Mc of 30,000 to 50,000, which can absorb much water endomolecularly, are derived from polystyrene and copolymers, recycled or new. That is, they are derived from highly available marketed and used polymers which show surface coating affinity to all organic coating compositions.

These products that advance fire resistant action can form a lower surface in the coating where adherence and coat covering is offered. Or they can be added to the main coating composition especially to coloured coatings which are applied as water emulsions. Also, added to those formulations are inflammable inorganic materials such as lime, gypsum, silicones etc. in pulverised form so than they make a main uniform surface with complete fire protection.

It is obvious that the solution advanced for fire protection, apart from originality and high profitability, also can be employed in a good number of coating compositions, which can coat all that need to be fire protected, in houses, machinery, transport vehicles protection, and in inflammable operations and installations. The protection offered by those products is high since, by being burned or decomposed, they release much, water up to 400 times by weight on the fire edges resulting to spontaneous fire quenching, thus offering complete protection against fire.

EXAMPLES

The ability of those coated compositions which contain fire resistant products were demonstrated in a number of cases.

a. Electrical cables which were coated with a composition containing 5% of these products showed high fire resistant action.

b. Wood constructions which were coated with emulsion paints containing the products in proportion higher than 3% did not burn.

c. Polymer sites in a car which were coated with a coating composition containing 6% of these products did not show an ability to burn.

d. Industrial installations processing petroleum products being coated with a paint containing those products in quantity more that 5% did not burn.

e. Coating with water emulsion paints in houses and the equipment in houses which contain those products at quantity more than 3% did not burn.

With these application results, we feel that the high potential in fire resistant action of those products described is shown.

What is claimed is:

1. A method for inducing fire resistance in an article, said method comprising:
    coating the article with a composition comprising an inorganic material and a product containing strongly bound endomolecular water, wherein the product is a polymer or copolymer of polystyrene and the endomolecular water is up to about 400 times the weight of the product.

2. The method according to claim 1, wherein the article is an electrical cable, telephone connection, wood construction, polymer construction or industrial installation.

3. The method according to claim 1, wherein the polymer contains high density ionic groupings.

4. The method according to claim 1, wherein during a fire, the product is decomposed to release water at an edge of the fire.

5. The method according to claim 1, wherein the product is mixed with a paint.

6. The method according to claim 5, wherein the paint is an emulsion paint.

7. The method according to claim 1, wherein about 3–10 weight % of the product is added to a coating or painting composition.

8. The method according to claim 1, wherein the product comprises a first surface coating, and over the first surface coating is a main coating.

9. The method according to claim 1, wherein the inorganic material is selected from the group consisting of lime, gypsum and silicone.

10. The method according to claim 1, wherein the inorganic material is pulverized.

11. The method according to claim 1, wherein the polymer is a recycled polymer.

12. The method according to claim 1, wherein the inorganic material is inflammable.

13. The method according to claim 1, wherein the polystyrene contains high density ionic groups.

14. The method according to claim 1, wherein the polymer is macroreticular at an Mc of 30,000 to 50,000.

* * * * *